(12) United States Patent
Lee et al.

(10) Patent No.: US 9,712,305 B2
(45) Date of Patent: Jul. 18, 2017

(54) METHOD AND APPARATUS FOR TRANSMITTING AND RECEIVING MULTI-USER CONTROL CHANNELS IN A WIRELESS COMMUNICATION SYSTEM WITH MULTIPLE ANTENNAS

(75) Inventors: In Ho Lee, Gyeonggi-do (KR); Jin Kyu Han, Seoul (KR); Young Han Nam, Richardson, TX (US); Joon Young Cho, Gyeonggi-do (KR); Hyoung Ju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 602 days.

(21) Appl. No.: 12/902,954

(22) Filed: Oct. 12, 2010

(65) Prior Publication Data

US 2011/0085506 A1    Apr. 14, 2011

(30) Foreign Application Priority Data

Oct. 9, 2009  (KR) ........................ 10-2009-0096240

(51) Int. Cl.
*H04W 4/00* (2009.01)
*H04L 5/00* (2006.01)

(52) U.S. Cl.
CPC ............ *H04L 5/0053* (2013.01); *H04L 5/005* (2013.01); *H04L 5/0023* (2013.01); *H04L 5/0037* (2013.01); *H04L 5/0044* (2013.01); *H04L 5/0051* (2013.01); *H04L 5/0064* (2013.01); *H04L 5/0092* (2013.01)

(58) Field of Classification Search
CPC .................................................... H04L 5/0023
USPC ........................................................ 370/329
See application file for complete search history.

(56) References Cited

U.S. PATENT DOCUMENTS 8,009,617 B2 *  8/2011  Sarkar et al. ................. 370/328
8,160,018 B2 *  4/2012  Zhang .................... H04L 1/1671
                                                                  370/208
8,315,225 B2 * 11/2012  Xu et al. ....................... 370/330
(Continued)

FOREIGN PATENT DOCUMENTS

KR  WO 2008111798 A1 *  9/2008  ........... H04L 5/0023
KR  WO 2009041770 A2 *  4/2009  ............ H04W 72/06

OTHER PUBLICATIONS

Robert Love et al., "Downlink Control Channel Design for 3GPP LTE", 2008 IEEE Wireless Communications and Networking Conference, Apr. 3, 2008.

(Continued)

*Primary Examiner* — Guang Li
(74) *Attorney, Agent, or Firm* — The Farrell Law Firm, P.C.

(57) ABSTRACT

Provided are a method and apparatus for transmitting and receiving multi-user control channels through a data channel region in a wireless communication system using multiple antennas. Further provided is a definition of a new search space for control channel candidates. In the transmitting method, a base station forms control channels for a plurality of user equipment each of which is composed of at least one resource block, performs a mapping for the control channels by dividing a space of the same transmission region in a data channel region of a sub-frame, and then multiplexes the control channels with data channels in the data channel region of the sub-frame and to transmit the multiplexed control channels.

16 Claims, 12 Drawing Sheets

(56) References Cited

U.S. PATENT DOCUMENTS

| | | | |
|---|---|---|---|
| 8,441,996 B2* | 5/2013 | Kim et al. | 370/329 |
| 8,520,626 B2* | 8/2013 | Lu | H04W 72/005 370/330 |
| 8,730,850 B2* | 5/2014 | Noh | H04L 5/0023 370/280 |
| 8,731,088 B2* | 5/2014 | Ko | H04B 7/04 375/259 |
| 8,787,245 B2* | 7/2014 | Seo | H04B 7/155 370/315 |
| 9,025,688 B2* | 5/2015 | Ko | H04B 7/0639 375/267 |
| 9,048,976 B2* | 6/2015 | Noh | H04L 5/0007 |
| 2008/0192622 A1 | 8/2008 | Scheim et al. | 370/210 |
| 2009/0010213 A1* | 1/2009 | Yamada et al. | 370/329 |
| 2009/0046582 A1* | 2/2009 | Sarkar et al. | 370/230.1 |
| 2009/0046793 A1 | 2/2009 | Love et al. | |
| 2009/0161636 A1* | 6/2009 | Collins et al. | 370/336 |
| 2009/0213802 A1* | 8/2009 | Miki et al. | 370/329 |
| 2009/0220017 A1* | 9/2009 | Kawamura et al. | 375/260 |
| 2009/0232062 A1 | 9/2009 | Higuchi et al. | |
| 2009/0285193 A1* | 11/2009 | Kim | H04L 5/0007 370/342 |
| 2010/0002800 A1* | 1/2010 | Kim | H04L 5/0037 375/295 |
| 2010/0061345 A1* | 3/2010 | Wengerter et al. | 370/335 |
| 2010/0061360 A1* | 3/2010 | Chen | H04L 5/0023 370/342 |
| 2010/0067465 A1* | 3/2010 | Miki et al. | 370/329 |
| 2010/0103901 A1* | 4/2010 | Miki et al. | 370/330 |
| 2010/0111226 A1* | 5/2010 | Ko | H04B 7/0639 375/299 |
| 2010/0182903 A1* | 7/2010 | Palanki et al. | 370/225 |
| 2010/0195583 A1* | 8/2010 | Nory et al. | 370/329 |
| 2010/0208673 A1* | 8/2010 | Nam | H04W 72/06 370/329 |
| 2010/0232384 A1* | 9/2010 | Farajidana | H04L 5/005 370/329 |
| 2010/0246427 A1* | 9/2010 | Gheorghiu | H04L 1/007 370/252 |
| 2010/0272201 A1* | 10/2010 | Nakao et al. | 375/260 |
| 2010/0290406 A1* | 11/2010 | Miki et al. | 370/329 |
| 2010/0303034 A1* | 12/2010 | Chen | H04L 5/0023 370/329 |
| 2010/0309876 A1* | 12/2010 | Khandekar | H04L 5/0037 370/330 |
| 2010/0316160 A1* | 12/2010 | Bui | 375/295 |
| 2011/0007695 A1* | 1/2011 | Choi et al. | 370/329 |
| 2011/0013615 A1* | 1/2011 | Lee | H04L 5/0023 370/344 |
| 2011/0069637 A1* | 3/2011 | Liu | H04L 5/0007 370/254 |
| 2011/0075750 A1* | 3/2011 | Miki et al. | 375/260 |
| 2011/0110296 A1* | 5/2011 | Malladi et al. | 370/328 |
| 2011/0194514 A1* | 8/2011 | Lee et al. | 370/329 |
| 2011/0244877 A1* | 10/2011 | Farajidana et al. | 455/452.2 |
| 2011/0292865 A1* | 12/2011 | Seo | H04B 7/15528 370/315 |
| 2012/0207084 A1* | 8/2012 | Seo | H04B 7/155 370/315 |
| 2012/0300738 A1* | 11/2012 | Palanki et al. | 370/329 |
| 2013/0223402 A1* | 8/2013 | Feng | H04L 5/0007 370/330 |

OTHER PUBLICATIONS

Mathias Bohge et al., "Multi-User OFDM System Performance Subject to Control Channel Reliability in a Multi-Cell Environment", 2008 IEEE International Conference on Communications, May 23, 2008.

Fujitsu, "DL Reference Signal Design for 8×8 MIMO in LTE-Advanced", R1-090706, 3GPP TSG-RAN1 #56, Feb. 9-13, 2009.

Motorola, "Control Signaling for LTE Rel-9 Enhanced DL Transmission", R1-093408, 3GPP TSG RAN WG1 #58, Aug. 24-28, 2009.

European Search Report dated May 7, 2015 issued in counterpart application No. 10822261.3-1851.

Nortel Networks, "Control Channel Design for the Support of Wider Bandwidth for LTE-Advanced", 3GPP TSG-RAN WG1 #57, R1-091923, May 4-8, 2009, 11 pages.

Korean Office Action dated Jan. 2, 2017 issued in counterpart application No. 10-2016-0167589, 10 pages.

* cited by examiner

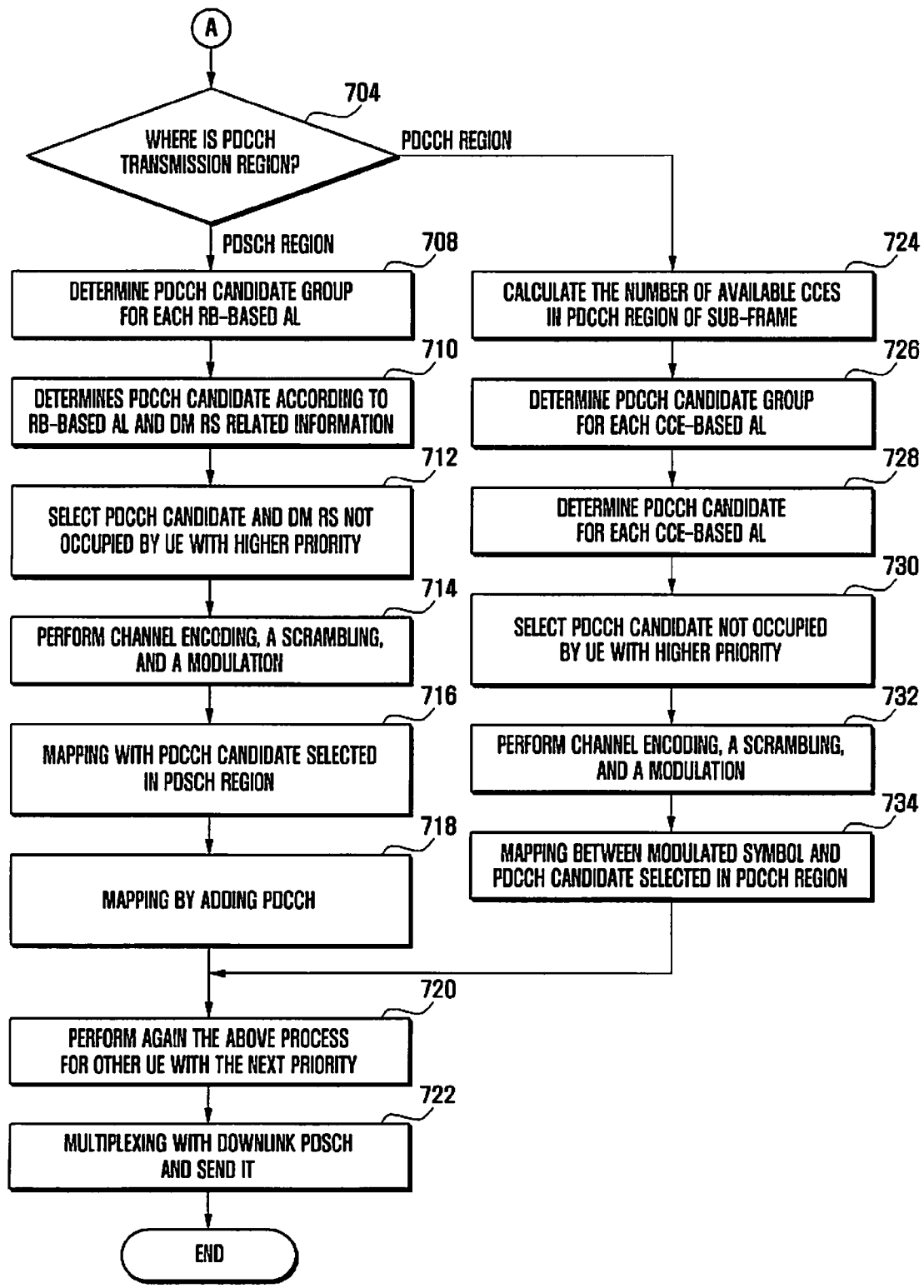

METHOD AND APPARATUS FOR TRANSMITTING AND RECEIVING MULTI-USER CONTROL CHANNELS IN A WIRELESS COMMUNICATION SYSTEM WITH MULTIPLE ANTENNAS

PRIORITY

This application claims priority under 35 U.S.C. §119(a) to a Korean Patent Application No. 10-2009-0096240, filed in the Korean Intellectual Property Office on Oct. 9, 2009, the disclosure of which is incorporated herein in its entirety by reference.

BACKGROUND OF THE INVENTION

1. Field of the Invention

The present invention relates generally to a method and apparatus for transmitting and receiving multi-user control channels for a plurality of user equipment in a wireless communication system using multiple antennas and, more particularly, to a method and apparatus for transmitting and receiving control channels multiplexed being based on a space division in a data channel region and also a definition of a control channel search space in consideration of characteristics of the data channel region.

2. Description of the Related Art

Modern mobile communication systems are evolving toward high-speed, high-quality wireless packet data communication systems for providing data services and multimedia services as well as offering traditional voice-based services. In order to support a high-speed, high-quality wireless packet data transmission service, a variety of mobile communication standards, such as HSDPA (High Speed Downlink Packet Access) and HSUPA (High Speed Uplink Packet Access) of 3GPP (the third Generation Partnership Project), HRPD (High Rate Packet Data) of 3GPP2, IEEE 802.16, and the like, have been developed in the art.

The existing third-generation wireless packet data communication systems such as HSDPA, HSUPA, HRPD, etc. use the Adaptive Modulation and Coding (AMC) technique, the channel dependent scheduling technique, etc. in order to improve its transmission efficiency. The AMC technique allows a transmitter to adjust the amount of transmitted data according to channel conditions. Namely, the transmitter decreases the amount of transmitted data under unfavorable channel conditions and thereby sets the probability of errors in receiving data to a desired level. Also, the transmitter increases the amount of transmitted data under favorable channel conditions and thereby effectively transmits a lot of information while setting the probability of errors in receiving data to a desired level. Meanwhile, the use of the channel dependent scheduling technique allows a transmitter to provide service to selected user equipment with excellent channel conditions among several user equipment. Therefore, system capacity is increased more in this case than in other cases wherein a channel is allocated to only one of the user equipment. Normally this increase of capacity refers to a multi-user diversity gain. In short, the AMC technique and the channel dependent scheduling technique may apply a proper modulation and coding type at the most efficient time determined depending on the feedback of information about partial channel conditions received from a receiver.

A recent trend in the art is to replace the CDMA (Code Division Multiple Access) method used in the second or third generation mobile communication systems with the OFDMA (Orthogonal Frequency Division Multiple Access) method in the next generation system. Currently, the 3GPP and the 3GPP2 are performing standardization for evolved systems using the OFDMA method, which is expected to produce a capacity increase in comparison with CDMA. One reason for a capacity increase in OFDMA is to allow frequency domain scheduling. As the channel dependent scheduling technique based on time-dependent variations of a channel produces a capacity gain, so can using frequency-dependent variations of a channel.

When the AMC technique and the channel dependent scheduling technique are realized, a base station adaptively allocates given wireless resources such as frequency, time, power, etc. according to the channel condition of user equipment. This adaptive allocation information is sent from a base station to user equipment through PDCCH (Physical Downlink Control Channel). By receiving PDCCH, the respective user equipment recognize their allocated wireless resources.

The allocation of wireless resources includes resource allocation for the downlink from a base station to user equipment and resource allocation for the uplink from user equipment to a base station. Downlink resource allocation is adaptively made according to channel condition reported by user equipment as well as the amount of data to be transmitted from a base station to the user equipment. A base station reports, through PDCCH, which resource is allocated to which user equipment for data transmission and which transport format indicating a modulation and coding type is used. Through PDCCH information, each user equipment recognizes whether a downlink resource is allocated and, if so, how to receive the transmitted signal through the allocated resource. Similarly, uplink resource allocation is adaptively made according to channel condition reported by user equipment as well as the amount of data to be transmitted. A base station reports, through PDCCH, which resource is allocated to which user equipment for data transmission and which transport format is used to send data to the allocated resource. Through PDCCH information, each user equipment recognizes whether an uplink resource is allocated and, if so, which transport format should be used.

Downlink Control Information (DCI) contained in PDCCH for a downlink resource allocation is generally as follows.

User Equipment Identification (UE ID) refers to information used for user equipment to determine whether there exists a signal transmitted to user equipment. Normally CRC (Cyclic Redundancy Check) depending on specific UE ID is inserted into DCI, so if specific user equipment successfully restores DCI, such control information is considered as information for such user equipment.

If DCI is successfully restored, user equipment recognizes from the Downlink Resource Block (DL RB) allocation information which resource blocks its own data is actually sent through.

Transport Format (TF) refers to a modulation and coding type of a transmitted signal. If the AMC technique is used, user equipment should know TF in order to perform a demodulation and decoding process.

Hybrid Automatic Repeat reQuest (HARQ) refers to a process in which a receiver informs a transmitter whether a transmitted packet is successfully received and then, in case of success, the transmitter sends the next packet and in case of failure, resends the same packet. HARQ related information includes a HARQ process number and any other related information such as an indication that a certain transmitted signal is original or repeated. Based on HARQ related information, user equipment determines whether to decode a currently received packet by combining with an earlier received packet or to decode it newly.

Additionally, DCI contained in PDCCH may further include information for transmission through multiple antennas, information for a power control, information about whether distributed transmission is used or not, and the like.

On the other hand, information contained in PDCCH for an uplink resource allocation is generally as follows.

If control information is successfully restored, user equipment recognizes from UL RB allocation information which resource blocks the data should be sent through.

User equipment should know the Transport Format (TF) to be used in order to create a signal in a demodulation and decoding manner requested by a base station.

Additionally, DCI may further include information about an uplink reference signal for supporting multiple access to the uplink space domain, information about whether distributed transmission is used or not, information about whether a channel condition report is requested or not, and the like.

FIG. 1 is a diagram illustrating a method for setting a control channel candidate group in a conventional wireless communication system.

Referring to FIG. 1, a Control Channel Element (CCE) refers to a unit of a logical channel that forms PDCCH. Particularly, a one-to-one correspondence exists between CCEs and Resource Elements (REs) which are units of a physical channel. Meanwhile, an Aggregation Level (AL) indicates how many CCEs constitute PDCCH. Namely, if PDCCH consists of N pieces of CCEs, AL becomes N. FIG. 1 shows examples of AL 1 in reference numeral 111, AL 2 in reference numeral 112, AL 4 in reference numeral 113 and AL 8 in reference numeral 114. If PDCCH uses one modulation type, the number of encoded bits to be transmitted reduces as AL decreases. This means that the code rate of channels in PDCCH is reduced. Namely, in case of a low AL, control information can be sent through fewer resources. However, user equipment can successfully receive it under a good channel condition. In case of a high AL, while relatively more resources are used, user equipment can successfully receive control information even under poor channel condition. For an effective use of resources, it is desirable that a control channel may be formed with a low AL for user equipment having good channel condition but formed with a high AL for user equipment having poor channel condition.

Additionally, the number of information bits forming DCI may be varied according to the attribute of control information. For instance, resource block allocation information may use many bits in order to increase the degree of freedom or use fewer bits instead of reducing the degree of freedom. Also, the number of information bits forming DCI is varied depending on whether to include various types of additional information. When different numbers of bits may form different DCIs, they are distinguished from each other by DCI format. Since user equipment does not know DCI format with which PDCCH is transmitted, it will be blind-decoded. Although transmitted to user equipment having the same channel conditions, PDCCH with DCI format using many bits, may be preferably transmitted with a higher AL than PDCCH with DCI format using few bits.

Specifically, let's suppose that eight CCEs, designated by reference numerals 100 to 107, are given. The number of CCEs is only exemplary and may be varied frequently. Factors that affect the number of CCEs include static values such as a downlink system bandwidth, the number of transmitting antennas of a base station, and the number of downlink ACK/NACK channels for supporting uplink HARQ, and control region information the value of which is changed at every sub-frame that is a time unit for scheduling.

Reference numerals 120 to 127 are PDCCH candidates for AL 1 111. For instance, reference numeral 120 indicates that PDCCH is formed using the only CCE 0 100, and a reference numeral 127 indicates that PDCCH is formed using the only CCE 7 107. Reference numerals 128 and 129 are PDCCH candidates for AL 2 112. For instance, reference numeral 128 indicates that PDCCH is formed using CCE 0 100 and CCE 1 101. Reference numeral 132 is one of PDCCH candidates for AL 4 113 and indicates that PDCCH is formed using four CCEs from CCE 0 100 to CCE 3 103. Reference numeral 134 is the only PDCCH candidate for AL 8 114 and indicates that PDCCH is formed using eight CCEs from CCE 0 100 to CCE 7 107.

A way of forming PDCCH candidates according to AL is based on a tree structure. Namely, AL 2 112 consists of a set of PDCCH candidates with AL 1 111, and AL 4 113 consists of a set of PDCCH candidates with AL 2 112. Also, AL 8 114 consists of a set of PDCCH candidates with AL 4 113. For instance, PDCCH indicated by reference numeral 132 is formed of four CCEs from CCE 0 to CCE 3, and this is a combination of a PDCCH candidate 128 formed of CCE 0 and CCE 1 and a PDCCH candidate 129 formed of CCE 2 and CCE 3 in AL 2 112. According to such a tree structure, when the total number of CCEs is N_CCE, the number of possible PDCCHs in specific AL is calculated by floor (N_CCE/AL). Here, floor(x) means a round-down function, which results in the maximum integer smaller than or equal to x.

The user equipment should attempt to perform a blind decoding in a PDCCH candidate group in order to find a downlink control channel transmitted to itself among several downlink control channels. Here, a blind decoding means that, when a base station sends PDCCH through one of control channel candidates defined in a control channel candidate group, user equipment receives PDCCH without any information about a control channel candidate through which control channel information is sent. For an effective blind decoding, a conventional Orthogonal Frequency Division Multiplexing (OFDM)-based LTE (Long Term Evolution) system defines a search space of PDCCH candidates for each user equipment as:

The first CCE location of the $m$-th PDCCH candidate for a given AL=AL$\{(Y_k+m)$ mod floor $(N\_CCE_k/AL)\}$, $m=0, \ldots, M_{AL}-1$      Equation (1)

Here, $N\_CCE_k$ refers to the total number of CCEs in the k-th sub-frame, and $M_{AL}$ refers to the number of PDCCH candidates in a PDCCH candidate group at each AL. Also, $Y_k$ is equal to $(39827 \times Y_{k-1})$ mod 65537, and $Y_{-1}$ indicates UE ID. Additionally, x mod y is a function that indicates the remainder after x is divided by y. If the first CCE location for a given AL is known from Equation (1), PDCCH candidates for a given AL are AL pieces of CCEs from the first CCE location.

FIG. 2 is a diagram illustrating the structure of a downlink sub-frame in a conventional LTE system.

Referring to FIG. 2, a single sub-frame 215 is composed of fourteen OFDM symbols designated by reference numerals 200 to 213. The front three symbols 200, 201 and 202 constitute a PDCCH region allocated to control channels (i.e., PDCCH), and the rest, 203 through 213, is a PDSCH (Physical Downlink Shared Channel) region allocated to data channels (i.e., PDSCH). While PDCCH is transmitted through the entire system bandwidth in the PDCCH region 200 to 202, PDSCH is transmitted on the basis of a Resource Block (RB) 214 that is a basic unit of scheduling. Each RB consists of twelve sub-carriers, and the total number of RBs is varied according to a system bandwidth. The reason that the PDCCH region 200 through 202 is located at the front of the sub-frame 215 is to allow user equipment to check first PDCCH. If PDCCH has no pertinent data, user equipment enters into a micro sleep mode in order to reduce power consumption in the PDSCH region 203 through 213.

FIG. 3 is a diagram illustrating the structure of downlink resource blocks in a conventional LTE-Advanced system.

Referring to FIG. 3, a common reference signal 300 in a PDCCH region 304 is used for channel estimation for PDCCH decoding, and a common reference signal 300 in a PDSCH region 305 is used for downlink channel measurement. Additionally, channel estimation for data decoding in the PDSCH region 305 uses code division multiplexing reference signal groups 301 and 302. Each of these groups 301 and 302 is multiplexed into a reference signal for multiple layers by using an orthogonal sign. For instance, in case of transmission of four layers, an orthogonal sign with a length 2 is applied to two reference signal REs that are continuous on a time domain, so two different reference signals are multiplexed for each reference signal group. Similarly, in case of transmission of eight layers, an orthogonal sign with length 4 is applied to four reference signal REs that are spread on a time domain, so four different reference signals are multiplexed for each reference signal group.

In case of transmission of one or two layers, it is possible to transmit a reference signal of each layer by using only a single code division multiplexing reference signal group 301. Therefore, the other code division multiplexing reference signal group 302 may be used for data transmission. The code division reference signal, corresponding to each layer, is transmitted by applying the same pre-coding applied to that layer. This makes it possible for a receiver to decode data without any information about a pre-coding applied in a transmitter.

FIG. 4 is a diagram illustrating a downlink transmission method based on multi-user multi-input multi-output in a conventional LTE-Advanced system.

FIG. 4 shows a way of transmitting data channels of multiple user equipment through the same resource by using a space division multiplexing technique at transmission using multiple antennas. In particular, the space division multiplexing technique achieves pre-coding data channels of multiple user equipment, with little interference with the space channels of the user equipment, followed by a transmission through the same resource. By using this technique, PDSCHs 404 to 407 of multiple user equipment can be transmitted through a single RB 402 in a PDSCH region 401. Here, PDSCHs 404 to 407 corresponding to respective layers are transmitted together with the reference signal groups 301 and 302 shown in FIG. 3. A decoding of PDSCHs 404 and 405 for layers 0 and 1 uses a channel value estimated from one code division multiplexing reference signal group 301 for the layers 0 and 1, and a decoding of PDSCHs 406 and 407 for layers 2 and 3 uses a channel value estimated from the other code division multiplexing reference signal group 302 for the layers 2 and 3.

However, the above-discussed wireless communication system based on multiple antennas may still confront a lack of control channel resources.

BRIEF SUMMARY OF THE INVENTION

Accordingly, the present invention is to address the above-mentioned problems and/or disadvantages and to offer at least the advantages described below.

An aspect of the present invention is to provide a method and apparatus for transmitting and receiving multi-user control channels through a data channel region in a wireless communication system using multiple antennas.

Another aspect of the present invention is to define a new search space for control channel candidates.

According to aspects of the present invention, methods for transmitting and receiving multi-user control channels through a data channel region in a wireless communication system using multiple antennas are based on the expansion of control channel resources by applying a space division multiplexing technique to multi-user control channels.

According to one aspect of the present invention, a method for transmitting multi-user control channels includes mapping control channels for a plurality of user equipment by dividing a space of the same transmission region in a data channel region of a sub-frame, each of the user equipment being composed of at least one resource block; and multiplexing the control channels with data channels in the data channel region of the sub-frame and then transmitting the multiplexed control channels.

According to another aspect of the present invention, a method for receiving multi-user control channels includes determining a transmission region in which control channels for a plurality of user equipment which is space-divided and mapped in a data channel region of a sub-frame, each of the user equipment being composed of at least one resource block; and receiving one of the control channels by decoding the transmission region in the data channel region.

According to still another aspect of the present invention, an apparatus for transmitting multi-user control channels includes a scheduler configured to form control channels for a plurality of user equipment each of which is composed of at least one resource block; a mapping unit configured to perform a mapping for the control channels by dividing the space of the same transmission region in a data channel region of a sub-frame; and a multiplexer configured to multiplex the control channels with data channels in the data channel region of the sub-frame and then to transmit the multiplexed control channels.

According to yet another aspect of the present invention, an apparatus for receiving multi-user control channels includes controller configured to determine a transmission region in which control channels for a plurality of user equipment are space-divided and mapped in a data channel region of a sub-frame, each of the user equipment being composed of at least one resource block; and a decoder configured to receive one of the control channels by decoding the transmission region in the data channel region under the control of the controller.

BRIEF DESCRIPTION OF THE DRAWINGS

Other aspects, advantages, and salient features of the invention will become apparent to those skilled in the art from the following detailed description, which, taken in conjunction with the annexed drawings, discloses embodiments of the invention.

FIGS. 7A and 7B are flow diagrams illustrating a method for transmitting multiple control channels multiplexed being based on a space division in a data channel region in accordance with an embodiment of the present invention;

DETAILED DESCRIPTION OF EMBODIMENTS OF THE PRESENT INVENTION

Figure 1:
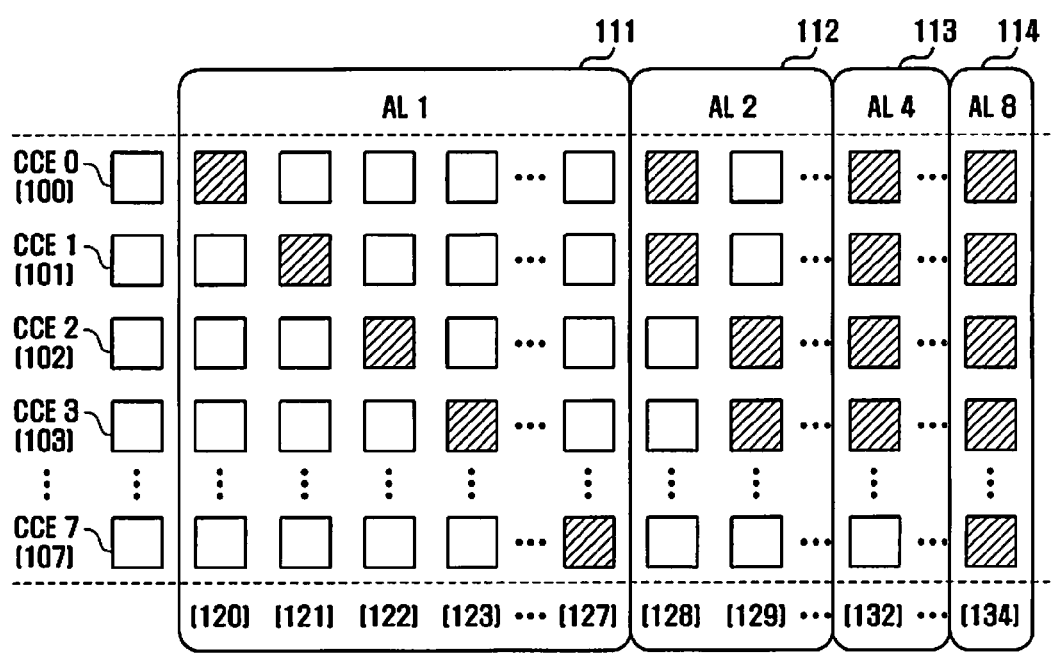
FIG. 1 is a diagram illustrating a method for setting a control channel candidate group in a conventional wireless communication system.
Figure 2:
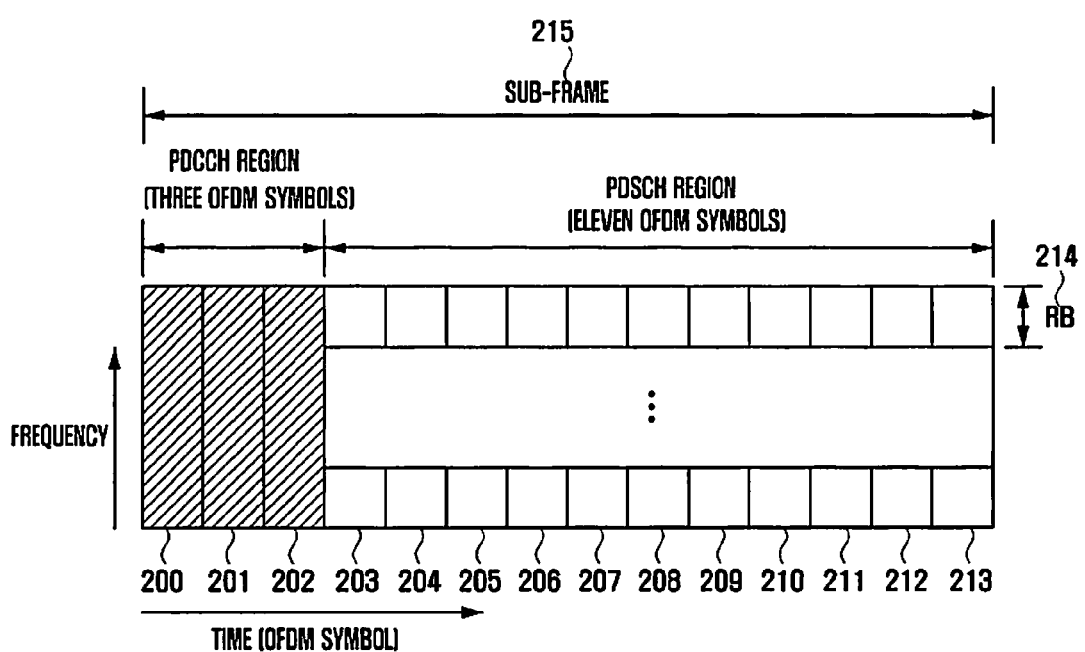
FIG. 2 is a diagram illustrating the structure of a downlink sub-frame in a conventional LTE system.
Figure 3:
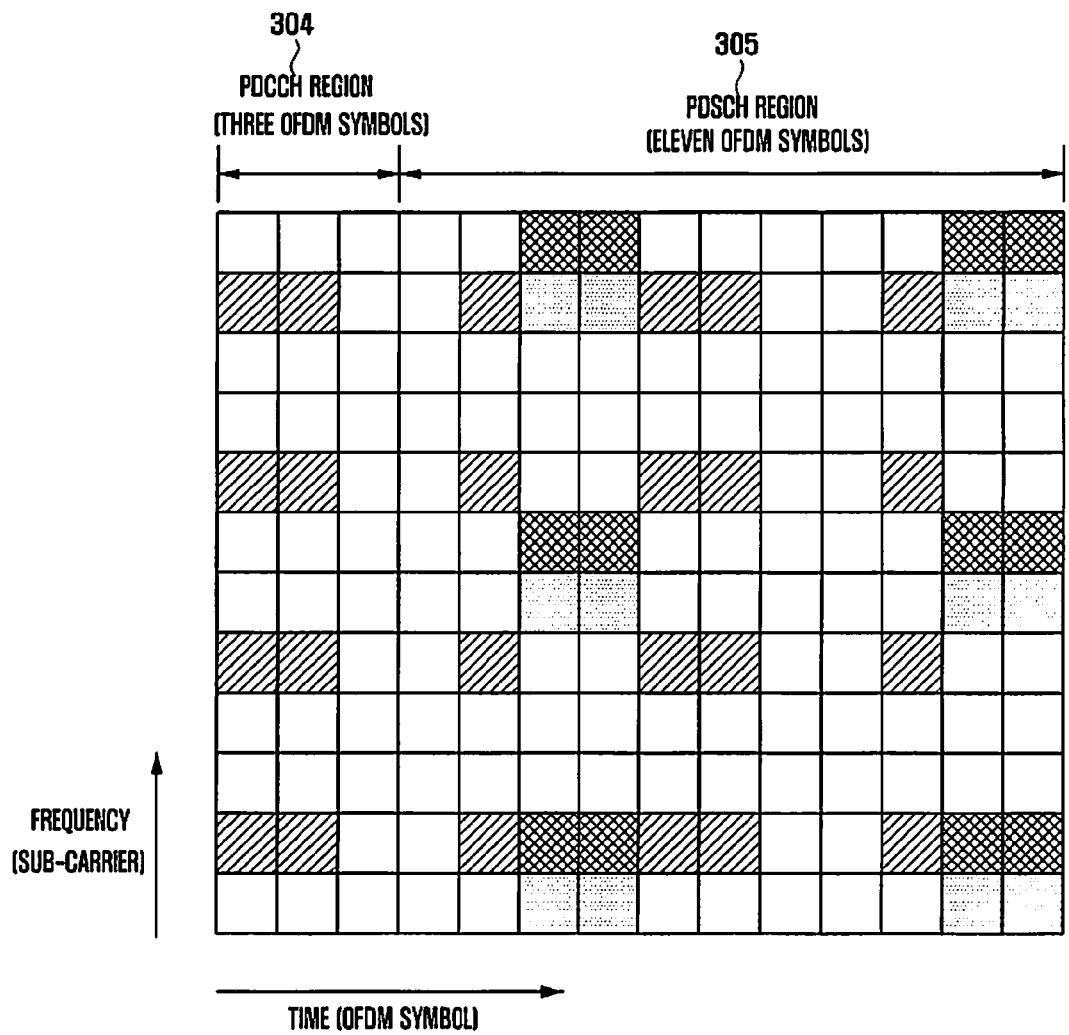
FIG. 3 is a diagram illustrating the structure of downlink resource blocks in a conventional LTE-Advanced system.
Figure 4:
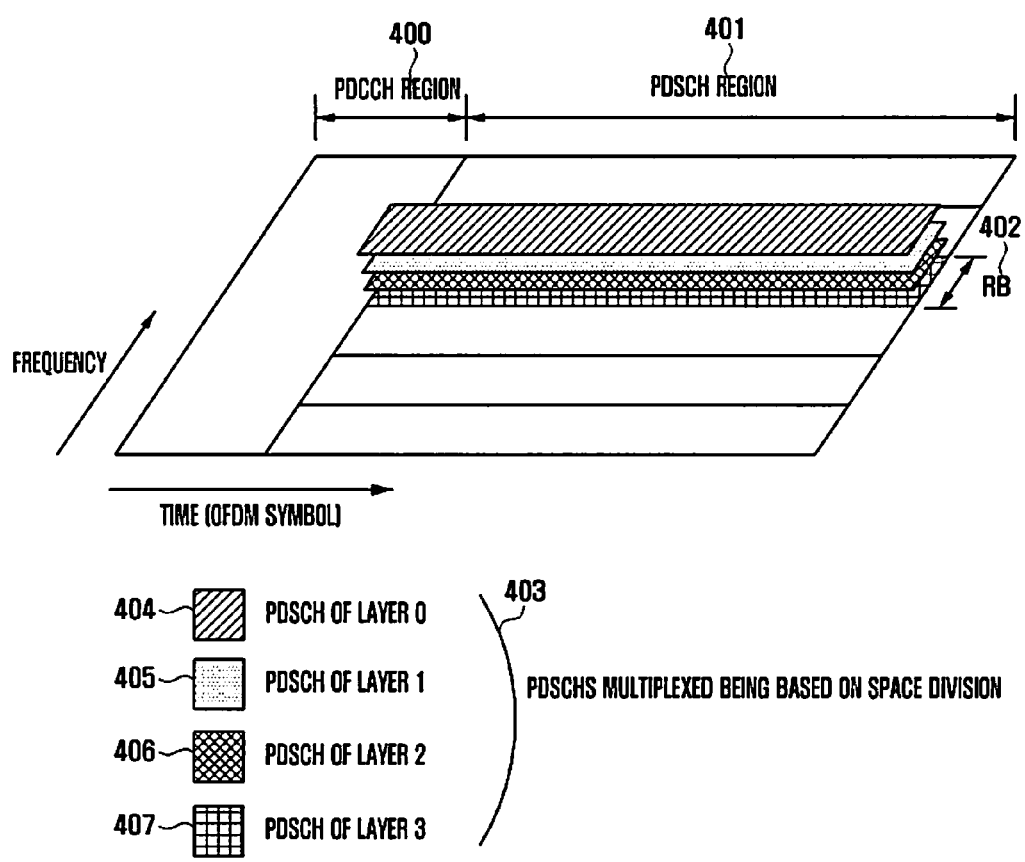
FIG. 4 is a diagram illustrating a downlink transmission method based on multi-user multi-input multi-output in a conventional LIE-Advanced system.

Embodiments of the present invention will now be described in detail with reference to the accompanying drawings. This invention may, however, be embodied in many different forms and should not be construed as limited to the embodiments set forth herein. Rather, the disclosed embodiments are provided so that this disclosure is thorough and complete, and fully convey the scope of the invention to those skilled in the art. The principles and features of this invention may be employed in varied and numerous embodiments without departing from the scope and spirit of the present invention.

Furthermore, well known or widely used techniques, elements, structures, and processes may not be described or illustrated in detail to avoid obscuring the essence of the present invention. Although the drawings represent embodiments of the invention, the drawings are not necessarily to scale and certain features may be exaggerated or omitted in order to better illustrate and explain the present invention.

According to this invention, methods for transmitting and receiving multi-user control channels through a data channel region, in a wireless communication system using multiple antennas, are based on the expansion of control channel resources by applying a space division multiplexing technique to multi-user control channels.

In order to transmit multi-user control channels, the present invention provides a control channel transmission structure similar with a data channel transmission structure and also provides a new definition of a search space for control channel candidates adapted to the above-proposed transmission structure.

When a control channel is transmitted and received through a data channel region in a wireless communication system based on multiple antennas, there may arise incompatibility of a PDCCH transmission structure with a PDSCH transmission structure and an impossible reuse of a search space for PDCCH candidates. In order to solve these problems, the present invention changes a basic unit of PDCCH transmission from CCE to RB. In addition, the present invention provides for use of a pre-coded Demodulation Reference Signal (DM RS, which is a generalized expression of a code division multiplexing reference signal) instead of a Common Reference Signal (CRS) when PDCCH is decoded. Also, the present invention further provides a redefinition of a search space for PDCCH candidates in order to meet an improved PDCCH transmission structure.

Herein, a control channel resource may be a control channel region allocated to a control channel (i.e., PDCCH), and a data channel resource may be a data channel region allocated to a data channel (i.e., PDSCH). The control channel region and the data channel region may be distinguished from each other by PCFICH that is a physical channel for transmitting CCFI (Control Channel Format Indicator) information. CCFI information tells the number of OFDM symbols constituting the control channel region in a sub-frame. User equipment fails to know the number of symbols allocated to a control channel until receiving CCFI. Therefore, user equipment should receive PCFICH first in a sub-frame except when downlink resources are fixedly allocated. In embodiments of this invention, the control channel region depends on the number of OFDM symbols, received by user equipment through PCFICH from a base station, in a downlink sub-frame. The remaining region becomes the data channel region. Particularly, it is possible to transmit an actual control channel signal through the data channel region.

A method for transmitting multi-user control channels through the data channel region by using a space division multiplexing technique is described hereinafter. This method includes a way of using the entire RB in the data channel region and another way of using part of the RB in the data channel region. Before anything else, described hereinafter are methods for defining a search space for PDCCH candidates in each user equipment in order to perform a blind decoding of a control channel.

According to an embodiment of the present invention, control channel transmission is based on RB in the data channel region and PDCCH candidate search space is defined based on common DM RS.

Figure 5:
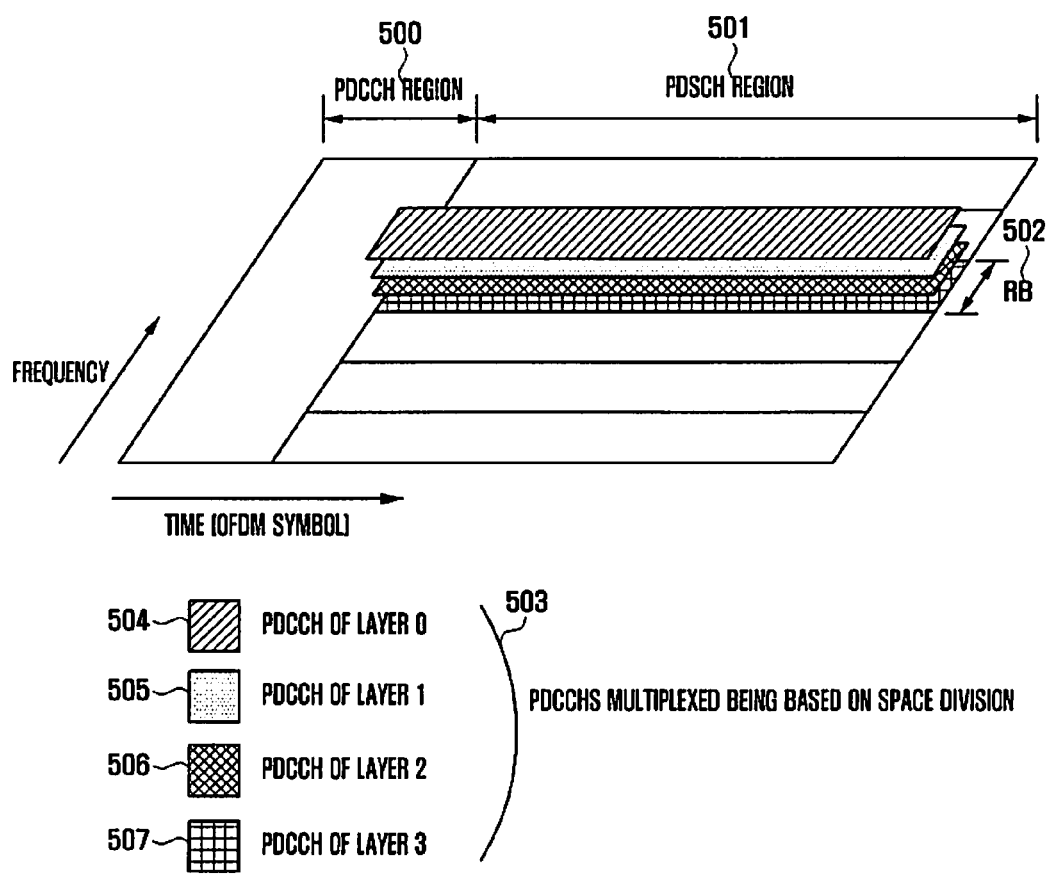
FIG. 5 is a diagram illustrating a method for transmitting multiple control channels multiplexed being based on a space division in a data channel region in accordance with an embodiment of the present invention.

FIG. 5 is a diagram illustrating a method for transmitting multiple control channels multiplexed being based on a space division in a data channel region in accordance with an embodiment of the present invention. This embodiment supposes a space channel condition that allows transmitting four layers through a single RB resource.

Referring to FIG. 5, by using space division multiplexing 503, PDCCH as well as PDSCH of multiple user equipment can be transmitted through RB 502 in a PDSCH region 501. A control channel or data channel corresponding to each layer 504 to 507 is decoded using DM RS. Here, DM RS used for each layer is pre-coded in the same manner that the control channel or the data channel transmitted through that RB. Each DM RS may be a code division multiplexing reference signal, a time division multiplexing reference signal, or a frequency division multiplexing reference signal. By using such a DM RS, pre-coding information is not needed for decoding a control channel or data channel. However, layer number information is needed to differentiate DM RS corresponding to each channel when channels of multiple user equipment are transmitted through the same resource. Since there is no information about layer numbers in case of a control channel decoding, a blind decoding is tried for possible layer numbers.

A base station determines whether to perform a control channel transmission in the data channel region, depending on the degree of use of control channel resources. Once determined, the base station instructs the user equipment to receive a control channel in the data channel region by means of superior signaling. Also, the maximum number of layers may be transmitted through such superior signaling. This is to reduce a loss due to a blind decoding by restricting the number of trying a blind decoding for possible layer numbers.

In case where multi-user control channels are transmitted using RB through the data channel region 501, a search space for PDCCH candidates based on common DM RS used for an effective blind decoding of multi-user control channels is redefined as Equations (2) and (3) given below.

The first RB location of the $m$-th PDCCH candidate for a given AL_RB=AL_RB$\{(Y_k+m)$ mod floor $(N\_RB_k/AL\_RB)\}$, $m=0, \ldots, M_{AL\_RB}-1$     Equation (2):

Here, AL_RB is an aggregation level in each RB. Additionally, $N\_RB_k$ means the total number of RBs in the k-th sub-frame, and $M_{AL\_RB}$ means the number of PDCCH candidates in each AL_RB. Also, $Y_k$ is a random variable in each user equipment. $Y_k$ may be equal to $(39827 \times Y_{k-1})$ mod 65537, and $Y_{-1}$ may be UE ID. Additionally, x mod y is a function that indicates the remainder after x is divided by y.

A possible DM RS number of each PDCCH candidate=$Y_k$ mod $N\_commonDMRS_k$     Equation (3):

If the first RB location for a given AL_RB is known from Equation (2), PDCCH candidates for a given AL_RB are AL_RB pieces of RBs from the first RB location. Here, $N\_RB_k$, AL_RB, and $M_{AL\_RB}$ in each AL_RB are predefined in consideration of a loss required for a blind decoding in the user equipment and a decoding efficiency, and also $N\_RB_k$ may be defined differently in each sub-frame. The base station and user equipment share such information in advance. Equation (3) indicates a DM RS number (i.e., a layer number) to be tried when a blind decoding is tried for a PDCCH candidate obtained from Equation (2). Here, $N\_commonDMRS_k$ is a specific value considered in common for the entire RB by all user equipment in the k-th sub-frame and is also the maximum number of possible DM RSs (i.e., the maximum number of possible layers). In addition, this value is determined by the base station in view of AL_RB and $M_{AL\_RB}$ in each AL_RB related to a space channel of the user equipment and a loss of a decoding, and also is broadcasted by means of superior signaling.

Namely, the user equipment obtains a random DM RS number based on UE ID by using $N\_commonDMRS_k$ received from the base station and then performs a blind decoding in an RB-based PDCCH candidate selected by Equation 2. If transmission of $N\_commonDMRS_k$ through superior signaling is not allowed, the user equipment always performs a blind decoding for a fixed arbitrary DM RS number only.

Since each user equipment fails to know how many layers are transmitted in an RB region for a PDCCH transmission, the user equipment performs a PDCCH blind decoding in consideration of the maximum RE resources for a reference signal. In other words, regardless of a DM RS number obtained for a blind decoding, the user equipment excludes all RE resources for a reference signal corresponding to the maximum layer transmission in a PDCCH blind decoding.

According to a second embodiment of the present invention, control channel transmission is based on RB in the data channel region and PDCCH candidate search space is defined based on RB-specific DM RS.

The second embodiment uses a blind decoding based on an RB-specific DM RS instead of a blind decoding based on a common DM RS used in the first embodiment. Namely, a PDCCH candidate based on RB is obtained from Equation (2), and an RB-specific DM RS candidate is defined as:

A possible DM RS number of each PDCCH candidate=$Y_k$ mod $N\_RB\_DMRS_{k,i}$     Equation (4)

If the first RB location for a given AL_RB is known from Equation (2), PDCCH candidates for a given AL_RB are AL_RB pieces of RBs from the first RB location. Here, $N\_RB_k$, AL_RB, and $M_{AL\_RB}$ in each AL_RB are predefined in consideration of a loss required for a blind decoding in user equipment and a decoding efficiency, and also $N\_RB_k$ may be defined differently in each sub-frame. The base station and user equipment share such information in advance. Additionally, Equation (4) indicates a DM RS number (i.e., a layer number) to be tried when a blind decoding is tried for a PDCCH candidate obtained from Equation (2). Here, $N\_RB\_DMRS_{k,i}$ is the maximum number of possible DM RSs for the i-th RB or RB group in the k-th sub-frame (i.e., the maximum number of possible layers). In addition, this value is determined by the base station in view of AL_RB and $M_{AL\_RB}$ in each AL_RB related to a space channel of the user equipment and a loss of a decoding, and also is broadcasted to all user equipment in a cell by means of superior signaling.

Namely, the user equipment obtains a random DM RS number based on UE ID by using $N\_RB\_DMRS_{k,i}$ received from the base station and then performs a blind decoding in an RB-based PDCCH candidate selected by Equation (2). If transmission of $N\_RB\_DMRS_{k,i}$ through a superior signaling is not allowed, the user equipment always performs a blind decoding for a fixed arbitrary DM RS number only.

Since each user equipment fails to know how many layers are transmitted in an RB region for a PDCCH transmission, the user equipment performs a PDCCH blind decoding in consideration of the maximum RE resources for a reference signal. In other words, regardless of a DM RS number obtained for a blind decoding, the user equipment excludes all RE resources for a reference signal corresponding to the maximum layer transmission in a PDCCH blind decoding.

According to a third embodiment of the present invention, control channel transmission is based on RB in the data channel region and PDCCH candidate search space is defined based on UE-specific DM RS.

The third embodiment uses a blind decoding based on a UE-specific DM RS instead of a blind decoding based on a common DM RS or based on an RB-specific DM RS used in the above embodiments. Namely, a PDCCH candidate based on RB is obtained from Equation (2), and a UE-specific DM RS candidate is defined as:

A possible DM RS number of each PDCCH candidate=$Y_k$ mod $N\_UE\_DMRS_{k,j}$     Equation (5)

If the first RB location for a given AL_RB is known from Equation (2), PDCCH candidates for a given AL_RB are AL_RB pieces of RBs from the first RB location. Here, $N\_RB_k$, AL_RB, and $M_{AL\_RB}$ in each AL_RB are predefined in consideration of a loss required for a blind decoding in the user equipment and a decoding efficiency, and also $N\_RB_k$ may be defined differently in each sub-frame. The base station and user equipment share such information in advance. Additionally, Equation (5) indicates a DM RS number (i.e., a layer number) to be tried when a blind decoding is tried for a PDCCH candidate obtained from Equation (2). Here, $N\_UE\_DMRS_{k,j}$ is the maximum number of possible DM RSs for the j-th UE or UE group in the k-th sub-frame (i.e., the maximum number of possible layers). In addition, this value is determined by the base station in view of AL_RB and $M_{AL\_RB}$ in each AL_RB related to a space channel of the user equipment and a loss of a decoding, and also is broadcasted to each or a group of user equipment by means of superior signaling.

Namely, the user equipment obtains a random DM RS number based on UE ID by using $N\_UE\_DMRS_{k,j}$ received from the base station and then performs a blind decoding in an RB-based PDCCH candidate selected by Equation 2. If transmission of $N\_UE\_DMRS_{k,j}$ through superior signaling is not allowed, the user equipment always performs a blind decoding for a fixed arbitrary DM RS number only.

Since each user equipment fails to know how many layers are transmitted in an RB region for a PDCCH transmission, the user equipment performs a PDCCH blind decoding in consideration of the maximum RE resources for a reference signal. In other words, regardless of a DM RS number obtained for a blind decoding, the user equipment excludes all RE resources for a reference signal corresponding to the maximum layer transmission in a PDCCH blind decoding.

According to a fourth embodiment of the present invention, control channel transmission is based on RB in the data channel region and PDCCH candidate search space is defined based on Fixed DM RS.

The fourth embodiment uses a blind decoding based on a fixed DM RS instead of a blind decoding based on a random DM RS using UE ID in the above embodiments. Namely, a PDCCH candidate based on RB is obtained from Equation (2), and a fixed DM RS candidate is defined as:

$$\text{A possible DM RS number of each PDCCH candidate} = 0, 1, \ldots, N\_DMRS_k - 1 \quad \text{Equation (6)}$$

If the first RB location for a given AL_RB is known from Equation 2, PDCCH candidates for a given AL_RB are AL_RB pieces of RBs from the first RB location. Here, $N\_RB_k$, AL_RB, and $M_{AL\_RB}$ in each AL_RB are predefined in consideration of a loss required for a blind decoding in the user equipment and a decoding efficiency, and also $N\_RB_k$ may be defined differently in each sub-frame. The base station and user equipment share such information in advance. Additionally, Equation 6 indicates a DM RS number (i.e., a layer number) to be tried when a blind decoding is tried for a PDCCH candidate obtained from Equation 2. Here, $N\_DMRS_k$ is the maximum number of possible DM RSs in the k-th sub-frame (i.e., the maximum number of possible layers). In addition, this value is determined by the base station in view of AL_RB and $M_{AL\_RB}$ in each AL_RB related to a space channel of the user equipment and a loss of a decoding, and also is broadcasted to the user equipment by means of superior signaling.

Namely, for an RB-based PDCCH candidate selected by Equation 2, the user equipment performs a blind decoding from DM RS 0 to $N\_DMRS_k-1$ by using $N\_DMRS_k$. If transmission of $N\_DMRS_k$ through superior signaling is not allowed, the user equipment always performs a blind decoding for a fixed arbitrary DM RS number only.

Since each user equipment fails to know how many layers are transmitted in an RB region for a PDCCH transmission, the user equipment performs a PDCCH blind decoding in consideration of the maximum RE resources for a reference signal. In other words, regardless of a DM RS number obtained for a blind decoding, the user equipment excludes all RE resources for a reference signal corresponding to the maximum layer transmission in a PDCCH blind decoding.

According to a fifth embodiment of the present invention, control channel transmission is based on Part of RB in the data channel region.

Figure 6:
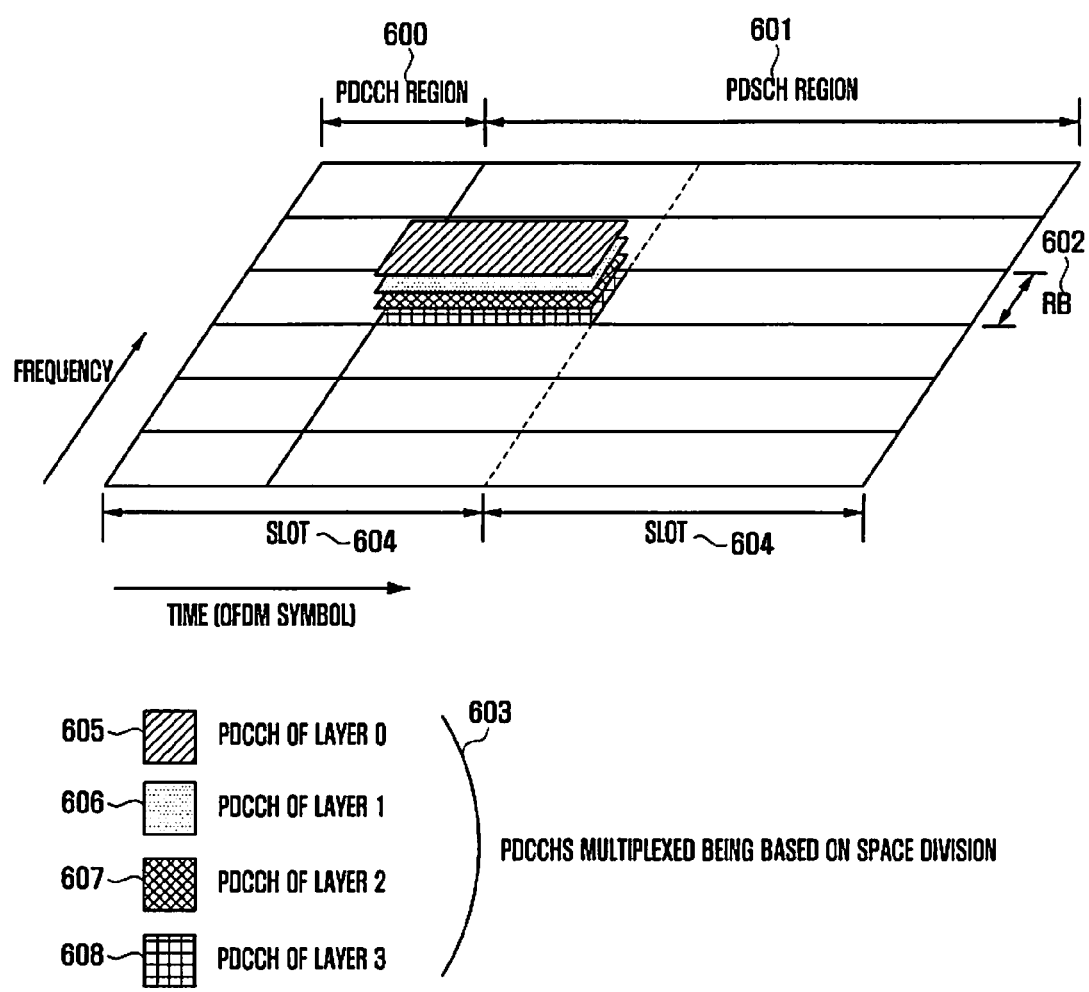
FIG. 6 is a diagram illustrating a method for transmitting multiple control channels multiplexed being based on a space division in a part of a data channel region in accordance with another embodiment of the present invention.

FIG. 6 is a diagram illustrating a method for transmitting multiple control channels multiplexed being based on a space division in a part of a data channel region in accordance with another embodiment of the present invention. This embodiment supposes a space channel condition that allows transmitting four layers through a single RB resource.

Referring to FIG. 6, a slot 604 is composed of seven OFDM symbols, and two continuous slots 604 constitute a single sub-frame. The first slot 604 of the sub-frame contains a PDCCH channel region 600 and a part of a PDSCH channel region 601. For instance, if the PDCCH channel region 600 is composed of three OFDM symbols, the PDSCH channel region 601 of the first slot 604 is composed of four OFDM symbols.

A method for transmitting multi-user control channels through the front slot 604 of an RB 602 in the PDSCH region 601 in this embodiment is for a micro sleep mode. Namely, like the purpose of a conventional design for the PDCCH channel region, this gives an effect of reducing power consumption of the user equipment. However, since this control channel transmission structure is different from a conventional data channel structure, a space division multiplexing transmission with PDSCH is difficult.

By using a space division multiplexing 603, PDCCH of multiple user equipment can be transmitted through the front slot 604 of RB 602 in a PDSCH region 601. A control channel corresponding to each layer 605 to 608 is decoded using DM RS corresponding to each layer. Here, DM RS used for each layer is pre-coded in the same manner that a control channel 605 to 608 transmitted through the RB 602. Each DM RS may be a code division multiplexing reference signal, a time division multiplexing reference signal, or a frequency division multiplexing reference signal. By using such a DM RS, pre-coding information is not needed for decoding a control channel 605 to 608. However, layer number information is needed to differentiate DM RS corresponding to each channel when channels of multiple user equipment are transmitted through the same resource. Since there is no information about layer numbers in case of a control channel decoding, a blind decoding is tried for possible layer numbers.

A base station determines whether to perform a control channel transmission in the data channel region 601, depending on a degree of using control channel resources. Additionally, if so, the base station further determines whether to use the entire RB 602 or to use the front slot 604 of the RB 602, and then instructs the user equipment to receive a control channel in the data channel region 601 by means of superior signaling. Also, the maximum number of layers may be transmitted through such superior signaling. This is to reduce a loss due to a blind decoding by restricting the number of trying a blind decoding for possible layer numbers.

In case where multi-user control channels are transmitted through the front slot 604 of the RB 602 in the data channel region 601, a search space for a PDCCH candidate in each user equipment for an effective blind decoding of multi-user control channels, namely a search space for an RB region and a DM RS number of a PDCCH candidate may be defined as Equations 2 to 6 previously discussed in the above embodiments.

As discussed also in the above embodiments, variables N_RB$_k$, AL_RB, and M$_{AL\_RB}$ are predefined and shared in advance by the base station and the user equipment. Additionally, N_commonDMRS$_k$, N_RB_DMRS$_{k,i}$, N_UE_DMRS$_{k,j}$, and N_DMRS$_k$ are determined by the base station and then broadcasted to the user equipment by means of superior signaling.

Therefore, by using DM RS related information received through superior signaling, the user equipment performs a blind decoding in a PDCCH candidate selected by Equation (2) for a decoding of PDCCH received in the PDSCH channel region 601. If transmission of DM RS related information through superior signaling is not allowed, the user equipment always performs a blind decoding for a fixed arbitrary DM RS number only.

Since each user equipment fails to know how many layers are transmitted in an RB region for a PDCCH transmission, the user equipment performs a PDCCH blind decoding in consideration of the maximum RE resources for a reference signal. In other words, regardless of a DM RS number obtained for a blind decoding, the user equipment excludes all RE resources for a reference signal corresponding to the maximum layer transmission in a PDCCH blind decoding.

Now, methods for transmitting and receiving multi-user control channels space-division-multiplexed in a data channel region are described hereinafter.

Figure 7A:
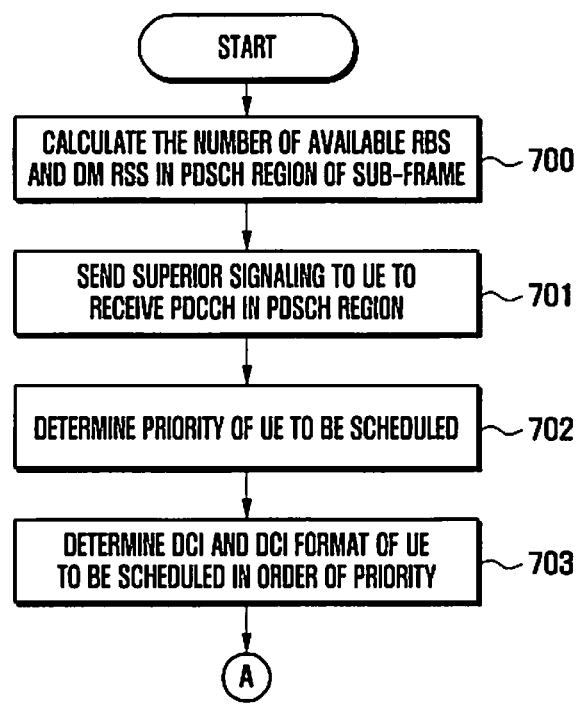

FIGS. 7A and 7B are flow diagrams illustrating a method for transmitting multiple control channels multiplexed being based on a space division in a data channel region in accordance with an embodiment of the present invention.

Referring to FIG. 7A, the base station calculates the number of available RBs and the number of DM RSs in the PDSCH region of each sub-frame in step 700. Then the base station instructs the user equipment to receive a control channel in the data channel region by means of superior signaling in step 701. In this step, through superior signaling, the base station sends information about the number of available RBs and the number of DM RSs to the user equipment using the PDSCH region for a PDCCH transmission. Next, the base station determines priority of the user equipment to be scheduled in step 702 and then determines DCI and DCI format of the user equipment to be scheduled in the order of priority in step 703. Next, in FIG. 7B, the base station determines whether a PDCCH transmission region of the user equipment is the PDCCH region or the PDSCH region in step 704. According to the PDCCH transmission region, different processes for a PDCCH transmission will follow.

If it is determined in step 704 that the PDCCH transmission region of the user equipment is the PDSCH region, the base station determines a PDCCH candidate group for each RB-based AL in step 708. Then the base station determines a PDCCH candidate (i.e., an RB region and a DM RS number of a PDCCH candidate) according to the RB-based AL and DM RS related information (i.e., N_commonDMRS$_k$, N_RB_DMRS$_{k,i}$, N_UE_DMRS$_{k,j}$, and N_DMRS$_k$) in step 710. Here, Equations (2) to (6) used to determine the PDCCH candidate group and the PDCCH candidate in steps 708 and 710 are hash functions. Next, the base station selects a PDCCH candidate and DM RS in the PDSCH which are not occupied by the user equipment with higher priority in step 712. In this step, the base station may select different DM RSs in the same PDCCH candidate. Then the base station successively performs a channel encoding, a scrambling, and a modulation while setting DCI to DCI format in step 714. Next, the base station multiplies DM RS and a modulated symbol by a pre-coding vector for a space division multiplexing and then performs a mapping with a PDCCH candidate selected in the PDSCH region in step 716. In this step, the base station may send PDCCH through only the front slot in a PDCCH candidate resource by applying a micro sleep mode. Additionally, if there is any PDCCH using different DM RSs in the selected PDCCH candidate resource, the base station performs a mapping by adding that PDCCH in step 718. If there is no PDCCH using different DM RSs in the selected PDCCH candidate resource, the base station omits step 718.

If it is determined in step 704 that the PDCCH transmission region of the user equipment is the PDCCH region, the base station calculates the number of available CCEs in the PDCCH region of each sub-frame in step 724. Then the base station determines a PDCCH candidate group for each CCE-based AL in step 726. Thereafter, the base station determines a PDCCH candidate for each CCE-based AL in step 728 and selects a PDCCH candidate in the PDCCH which is not occupied by the user equipment with higher priority in step 730. Then the base station successively performs a channel encoding, a scrambling, and a modulation while setting DCI to DCI format in step 732. Next, the base station performs a mapping between a modulated symbol and a PDCCH candidate selected in the PDCCH region in step 734.

Thereafter, in step 720, the base station again performs the above-discussed process from step 704 for other user equipment with the next priority to be scheduled. After a PDCCH mapping is completed for all user equipment to be scheduled, the base station performs a multiplexing with a downlink PDSCH in the sub-frame and sends it to the user equipment (step 722).

Figure 8A:
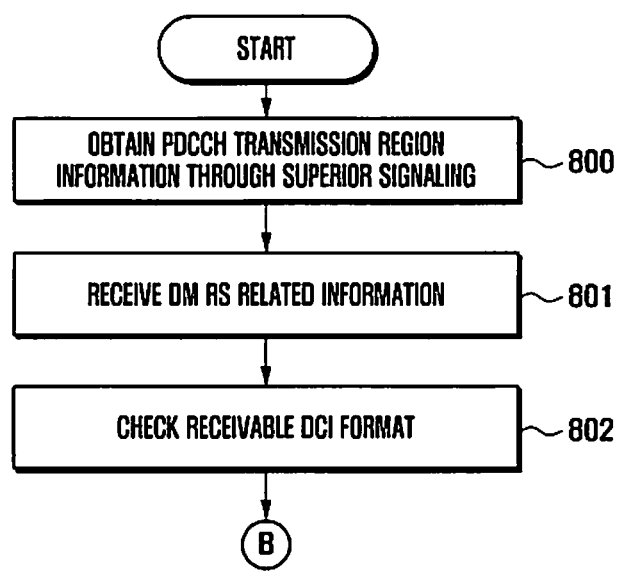
FIGS. 8A and 8B are flow diagrams illustrating a method for receiving multiple control channels multiplexed being based on a space division in a data channel region in accordance with an embodiment of the present invention.
Figure 8B:
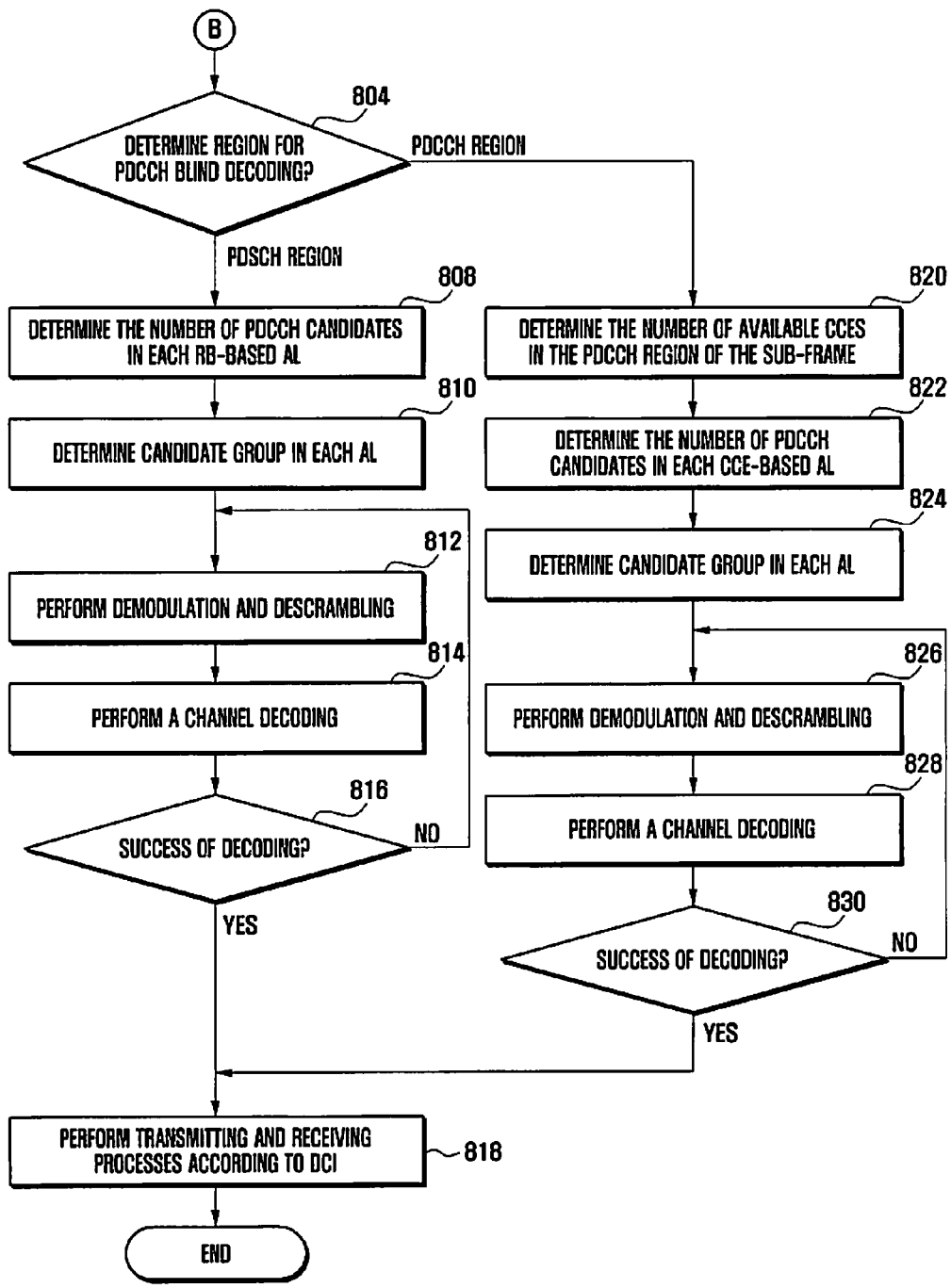

FIGS. 8A and 8B are flow diagrams illustrating a method for receiving multiple control channels multiplexed being based on space division in a data channel region in accordance with an embodiment of the present invention.

Referring to FIG. 8A, the user equipment obtains PDCCH transmission region information from the base station through superior signaling in step 800. In case of using the PDSCH region as the PDCCH transmission region, the user equipment receives DM RS related information (i.e., N_commonDMRS$_k$, N_RB_DMRS$_{k,i}$, N_UE_DMRS$_{k,j}$, and N_DMRS$_k$) from the base station through superior signaling in step 801. Next, the user equipment checks receivable DCI format in step 802. This receivable DCI format is predetermined by means of superior signaling. Then, in step 804, the user equipment determines a region for a PDCCH blind decoding by using information obtained in step 800. Namely, the user equipment determines whether the PDCCH transmission region is the PDCCH region or the PDSCH region.

If it is determined in step 804 that the PDCCH blind decoding region is the PDSCH region, the user equipment determines the number of PDCCH candidates in each RB-based AL in step 808. Then the user equipment determines a candidate group in each AL by applying the number of PDCCH candidates to hash functions in step 810. Here, hash functions refer to Equations (2) to (6) used to define a PDCCH candidate search space in the above embodiments. Each candidate of the candidate group is represented as a RB region and DM RS. Next, the user equipment performs a demodulation for the RB region and DM RS of a PDCCH candidate and then performs a descrambling by using the sub-frame number in step 812. Also, the user equipment performs a channel decoding in each receivable DCI format in step 814 and then determines success or failure of a decoding through a CRC check in step 816. In case of failure, the above steps 812 and 814 are repeated for other PDCCH candidate obtained from step 810. If a decoding is failed for all PDCCH candidates, it is determined that no PDCCH is transmitted to the user equipment. In case of success, the user equipment performs transmitting and receiving processes according to DCI of the decoded PDCCH in step 818.

If it is determined in step 804 that the PDCCH blind decoding region is the PDCCH region, the user equipment determines the number of available CCEs in the PDCCH region of the sub-frame in step 820. Then the user equipment determines the number of PDCCH candidates in each CCE-based AL in step 822 and further determines a candidate group in each AL by applying the number of PDCCH candidates to a hash function in step 824. Here, a hash function refers to Equation (1) used to define a conventional PDCCH candidate search space. Next, the user equipment performs a demodulation for the CCE of a PDCCH candidate and then performs a descrambling by using the sub-frame number in step 826. Also, the user equipment performs a channel decoding in each receivable DCI format in step 828 and then determines success or failure of a decoding through a CRC check in step 830. In case of failure, the above steps 826 and 828 are repeated for other PDCCH candidates obtained from step 824. If a decoding has failed for all PDCCH candidates, it is determined that no PDCCH is transmitted to the user equipment. In case of success, the user equipment performs transmitting and receiving processes according to DCI of the decoded PDCCH in step 818.

Hereinafter, apparatuses for transmitting and receiving multi-user control channels space-division-multiplexed in a data channel region are described.

Figure 9:
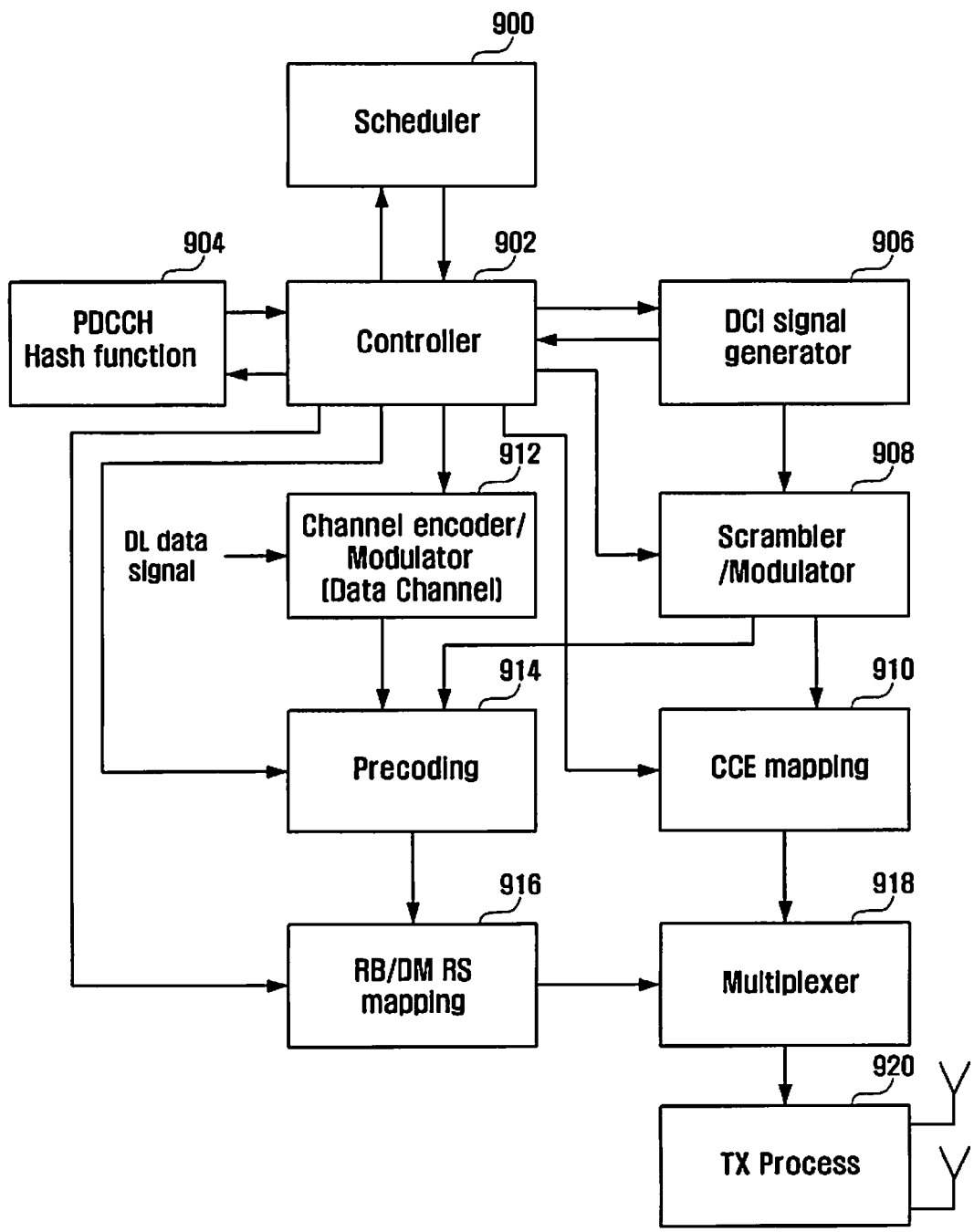
FIG. 9 is a block diagram illustrating the configuration of a base station for transmitting multi-user control channels in a wireless communication system using multiple antennas in accordance with an embodiment of the present invention.

First, a base station for transmitting a control channel in a wireless communication system is discussed. FIG. 9 is a block diagram illustrating the configuration of a base station for transmitting multi-user control channels in a wireless communication system using multiple antennas in accordance with an embodiment of the present invention.

Referring to FIG. 9, the base station includes a scheduler 900, a controller 902, a PDCCH hash function unit 904, a DCI signal generator 906, a scrambler/modulator 908, a CCE mapping unit 910, a channel encoder/modulator 912, a pre-coding unit 914, an RB/DM RS mapping unit 916, a multiplexer 918, and a transmitter 920.

The scheduler 900 determines whether to transmit PDCCH to which user equipment to allocate downlink resources and uplink resources and then gives priority to each user equipment. This process is performed depending on channel conditions reported by respective user equipment. The controller 902 controls entire operations of elements 904 through 916, based on the determination of the scheduler 900. The determination of the scheduler 900 may be updated at the discretion of the controller 902. The input of the hash function unit 904 differs depending on whether to use the PDSCH region or the PDCCH region for a PDCCH transmission. In case of using the PDSCH region for a PDCCH transmission, the hash function unit 904 receives the number of available RBs, the number of DM RSs, the number of PDCCH candidates, etc. from the controller 902. In case of using the PDCCH region for a PDCCH transmission, the hash function unit 904 receives the number of available CCEs, the number of PDCCH candidates, etc. from the controller 902. Then the hash function unit 904 determines a PDCCH candidate and returns it to the controller 902.

The determination of the scheduler 900 is converted into DCI through controller 902. The DCI signal generator 906 receives DCI from the controller 902 and then generates a DCI signal. The scrambler/modulator 908 performs a scrambling and a modulation by using a sub-frame number related to transmission of a data signal corresponding to the generated DCI signal. The controller 902 inputs a scrambled and modulated control signal into the pre-coding unit 914 in case of a PDCCH transmission in the PDSCH region, and inputs it into the CCE mapping unit 910 in case of a PDCCH transmission in the PDCCH region. The scrambled signal is transmitted through PDCCH selected by the controller 902 among PDCCH candidates determined in the hash function unit 904.

The channel encoder/modulator 912 performs a channel encoding and a modulation for a downlink data channel signal. The controller 902 determines a pre-coding matrix depending on channel information and then inputs it into the pre-coding unit 914. In addition, the pre-coding unit 914 multiplies signals respectively inputted from the encoder/modulator 912 and the scrambler/modulator 908 by the pre-coding matrix received from the controller 902. Here, a reference signal is pre-coded in the same manner. The RB/DM RS mapping unit 916 performs a mapping of pre-coded control signal and data signal to the RB region and DM RS for a PDCCH candidate determined by the controller 902. Then the multiplexer 918 generates a downlink signal by multiplexing coded and modulated data channel signal and control channel signal. The transmitter 920 sends the downlink signal.

Figure 10:
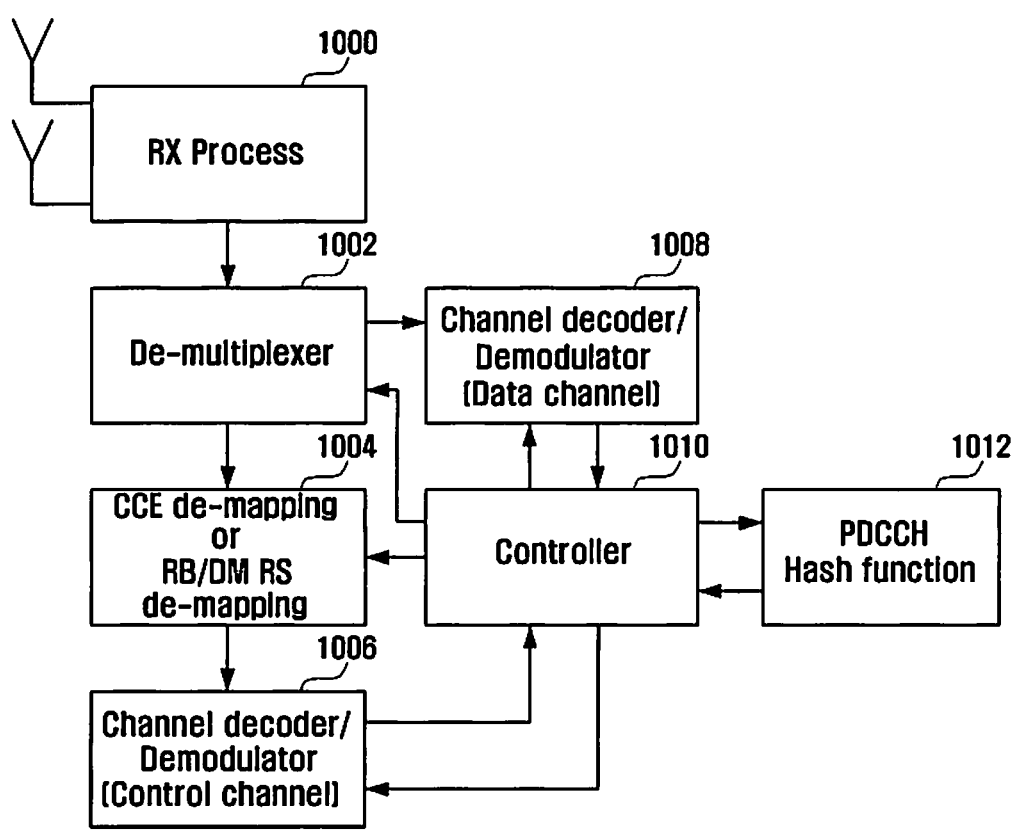
FIG. 10 is a block diagram illustrating the configuration of user equipment for receiving multi-user control channels in a wireless communication system using multiple antennas in accordance with an embodiment of the present invention.

Hereinafter, user equipment for receiving a control channel in a wireless communication system is discussed. FIG. 10 is a block diagram illustrating the configuration of user equipment for receiving multi-user control channels in a wireless communication system using multiple antennas in accordance with an embodiment of the present invention.

Referring to FIG. 10, the user equipment includes a receiver 1000, a de-multiplexer 1002, a CCE de-mapping unit or RB/DM RS de-mapping unit 1004, a control channel decoder/demodulator 1006, a data channel decoder/demodulator 1008, a controller 1010, and a PDCCH hash function unit 1012.

The receiver 1000 receives a signal from the base station through an antenna and then converts it into a baseband signal. The de-multiplexer 1002 de-multiplexes the received signal to control channel and data channel signals. Where a PDCCH transmission is performed in the PDSCH region, the controller 1010 controls the de-multiplexer 1002 to de-multiplex the PDSCH region and then inputs it into the DM RS de-mapping unit 1004. The input of the hash function unit 1012 differs depending on whether to use the PDSCH region or the PDCCH region for a PDCCH transmission. In case of using the PDSCH region for a PDCCH transmission, the hash function unit 1012 receives the number of available RBs, the number of DM RSs, the number of PDCCH candidates, etc. from the controller 1010. In case of using the PDCCH region for a PDCCH transmission, the hash function unit 1012 receives the number of available CCEs, the number of PDCCH candidates, etc. from the controller 1010. Also, the hash function unit 1012 determines a PDCCH candidate and returns it to the controller 1010. Then the controller 1010 reports PDCCH candidates to the CCE de-mapping unit or RB/DM RS de-mapping unit 1004.

If the PDCCH candidate inputted from the controller 1010 is based on CCE, the CCE de-mapping unit or RB/DM RS de-mapping unit 1004 performs a CCE de-mapping in the PDCCH region. If the PDCCH candidate inputted from the controller 1010 is based on RB and DM RS, the CCE de-mapping unit or RB/DM RS de-mapping unit 1004 performs an RB/DM RS de-mapping in the PDSCH region.

Meanwhile, the control channel decoder/demodulator 1006 performs a demodulation and a decoding in each PDCCH candidate de-multiplexed in the CCE de-mapping unit or RB/DM RS de-mapping unit 1004 and then reports success or failure of a decoding to the controller 1010. In case of failure in a specific PDCCH candidate, the control channel decoder/demodulator 1006 performs a demodulation and a decoding in other PDCCH candidate de-multiplexed in the CCE de-mapping unit or RB/DM RS de-mapping unit 1004 and then reports success or failure of a decoding to the controller 1010. When a decoding of PDCCH is successful, the control channel decoder/demodulator 1006 reports it to the controller 1010. Then the controller 1010 determines whether there is a downlink data signal transmitted to the user equipment through the decoded PDCCH. If so, the data channel decoder/demodulator 1008 performs a demodulation and a decoding for a data signal extracted in the de-multiplexer 1002.

According to this invention, by transmitting multi-user control channels in the data channel region by means of a space division multiplexing technique, it may be expected to solve a limited control channel resource problem and also to increase a system capacity due to a reduced control channel overhead.

While this invention has been particularly shown and described with reference to embodiments thereof, it will be understood by those skilled in the art that various changes in form and details may be made therein without departing from the spirit and scope of the invention as defined by the appended claims.

What is claimed is:

1. A method for transmitting control information, the method comprising:
    transmitting information on at least one resource block (RB) for a first control channel via higher signaling;
    transmitting information on a number of orthogonal frequency division multiplexing (OFDM) symbols for a second control channel in a subframe;
    determining a reference signal (RS) associated with the first control channel based on an identifier of a terminal;
    mapping control information for the first control channel and the RS to a part of OFDM symbols within the at least one RB; and
    transmitting the control information and the RS to the terminal,
    wherein the OFDM symbols for the second control channel are excluded from the part of the OFDM symbols.

2. The method of claim 1, wherein the control information and the RS associated with the first control channel are precoded equally.

3. The method of claim 1, wherein the RS associated with the first control channel is determined within a predetermined number of reference signals.

4. The method of claim 1, wherein the control information and the RS associated with the first control channel are mapped to predetermined symbols among the symbols excluding the symbols for the second control channel on the at least one subframe.

5. A method for receiving control information, the method comprising:
    receiving information on at least one resource block (RB) for a first control channel via higher signaling;
    receiving information on a number of orthogonal frequency division multiplexing (OFDM) symbols for a second control channel in a subframe; and
    receiving control information for the first control channel and a reference signal (RS) associated with the first control channel,
    wherein the RS associated with the first control channel is determined based on an identifier of a terminal,
    wherein the control information and the RS are mapped to a part of OFDM symbols within the at least one RB, and
    wherein the OFDM symbols for the second control channel are excluded from the part of the OFDM symbols.

6. The method of claim 5, wherein the RS associated with the first control channel is determined within a predetermined number of reference signals.

7. The method of claim 5, wherein the control information and the RS associated with the first control channel are mapped to predetermined symbols among the symbols excluding the symbols for the second control channel on the at least one subframe.

8. The method of claim 5, wherein the control information and the RS associated with the first control channel are precoded equally.

9. A base station for transmitting control information, comprising:
    a transceiver for transmitting signals to and from a terminal, and
    a controller configured to control the transceiver to transmit information on at least one resource block (RB) for a first control channel via higher signaling, to transmit information on a number of orthogonal frequency division multiplexing (OFDM) symbols for a second control channel in a subframe, to determine a reference signal (RS) associated with the first control channel based on an identifier of a terminal, to map control information for the first control channel and the RS to a part of OFDM symbols within the at least one RB, and to control the transceiver to transmit the control information and the RS to the terminal,
    wherein the OFDM symbols for the second control channel are excluded from the part of the OFDM symbols.

10. The base station of claim 9, wherein the RS associated with the first control channel is determined within a predetermined number of reference signals.

11. The base station of claim 9, wherein the control information and the RS associated with the first control channel are mapped to predetermined symbols among the symbols excluding the symbols for the second control channel on the at least one subframe.

12. The base station of claim 9, wherein the control information and the RS associated with the first control channel are precoded equally.

13. A terminal for receiving control information, comprising:
    a transceiver for transmitting signals to and from a base station, and
    a controller configured to control the transceiver to receive information on at least one resource block (RB) information for a first control channel via higher signaling, to receive information on a number of orthogonal frequency division multiplexing (OFDM) symbols for a second control channel in a subframe, and to receive the control information for the first control channel and a reference signal (RS) associated with the first control channel, wherein the RS associated with the first control channel is determined based on an identifier of a terminal, wherein the control information and the RS are mapped to a part of OFDM symbols within the at least one RB, and wherein the OFDM symbols for the second control channel are excluded from the part of the OFDM symbols.

14. The terminal of claim 13, wherein the control information and the RS associated with the first control channel are precoded equally.

15. The terminal of claim 13, wherein the RS associated with the first control channel is determined within a predetermined number of reference signals.

16. The terminal of claim 13, wherein the control information and the RS associated with the first control channel are mapped to predetermined symbols among the symbols excluding the symbols for the second control channel on the at least one subframe.

* * * * *